United States Patent [19]

Roehrich et al.

[11] Patent Number: 5,186,015
[45] Date of Patent: Feb. 16, 1993

[54] TRANSPORT REFRIGERATION UNIT AND METHOD OF OPERATING SAME

[75] Inventors: Roland L. Roehrich, Pittsburgh, Pa.; Jay L. Hanson, Bloomington, Minn.

[73] Assignee: Thermo King Corporation, Minneapolis, Minn.

[21] Appl. No.: 842,861

[22] Filed: Feb. 27, 1992

[51] Int. Cl.$^5$ ............................................. F25B 1/00
[52] U.S. Cl. ...................................... 62/133; 62/160; 62/228.4; 62/243; 123/179.4
[58] Field of Search ................ 62/133, 160, 239, 243, 62/244, 230, 323.1, 323.4, 228.4; 165/43; 123/179.1, 179.2, 179.3, 179.4

[56] References Cited

U.S. PATENT DOCUMENTS

| | | | |
|---|---|---|---|
| 4,333,316 | 6/1982 | Stamp, Jr. et al. | 62/160 X |
| 4,494,497 | 1/1985 | Uchida et al. | 123/179.4 |
| 4,819,441 | 4/1989 | Hanson | 62/160 |
| 5,024,186 | 6/1991 | Long et al. | 123/179.4 |
| 5,029,449 | 7/1991 | Wilkinson | 62/160 |

Primary Examiner—Harry B. Tanner
Attorney, Agent, or Firm—D. R. Lackey

[57] ABSTRACT

A transport refrigeration unit, and method of operating same, with the unit being associated with a vehicle having a drive engine and a cargo space to be conditioned to a predetermined set point temperature. The transport refrigeration unit includes a refrigerant compressor driven directly, or indirectly, by the vehicle engine. Sensors and control determine when the engine may be safely started and stopped under control of the transport refrigeration unit. A comparison between cargo temperature and set point temperature determines when a refrigeration cycle is required to maintain the set point temperature, and when the cargo space temperature is satisfied. The engine is started, when off, when the engine may be safely started and the cargo space requires a refrigeration cycle to maintain the set point temperature. The engine is stopped, when running, when the engine may be safely stopped and the cargo space is satisfied.

20 Claims, 4 Drawing Sheets

TRANSPORT REFRIGERATION UNIT AND METHOD OF OPERATING SAME

TECHNICAL FIELD

The invention relates in general to a transport refrigeration unit, and method of operating same, and more specifically to a transport refrigeration unit in which a refrigerant compressor for the unit is driven, directly, or indirectly, by an engine which also drives a vehicle having a cargo space conditioned by the unit.

BACKGROUND ART

Transport refrigeration systems or units, such as associated with straight trucks, tractor trailer combinations, and refrigerated containers (reefers), include those which have a dedicated prime mover for the refrigerant compressor, and those in which the compressor is driven by the engine of the associated vehicle. The latter are usually associated with small straight trucks and refrigerated delivery vans.

Transport refrigeration units normally condition a fresh or a frozen load in an associated cargo space to a predetermined set point temperature selected by a driver or attendant. The transport refrigeration unit automatically maintains the cargo space within a predetermined narrow temperature range adjacent to the selected set point temperature via cooling and heating cycles, as required. During a cooling cycle a refrigerant compressor directs refrigerant through a closed refrigerant flow circuit which includes a condenser and an evaporator. During a heating cycle to hold set point temperature, as well as for defrosting purposes, it is common to direct the refrigerant from the compressor directly to the evaporator, by-passing the condenser. Thus, cooling cycles and heating cycles may properly be termed refrigeration cycles.

With a dedicated prime mover, the prime mover is under the control of the transport refrigeration system, and may be started to initiate a predetermined refrigeration cycle, ie., a cooling cycle or a heating cycle, and stopped, as dictated by the requirements of the served cargo space. This start-stop operating mode, as opposed to a continuous operating mode, conserves fuel, when the prime mover is an internal combustion engine, and it conserves electricity, when the prime mover is an electric motor.

When the refrigeration system prime mover is an engine which also drives the associated truck or van, the prime mover is completely under control of the driver. Some transport refrigeration units in which the compressor is driven by the vehicle engine have a standby electric motor for driving the compressor when the vehicle is accessible to a source of electric potential. This standby arrangement is of no use, however, while the vehicle is making deliveries. Thus, when the driver leaves the vehicle, such as to make a delivery, lunch break, overnight away from the base terminal, and the like, the engine is either left running, which is wasteful of fuel, or it is turned off, which may endanger the load if the driver is delayed in returning to the vehicle. On a warm day, a load of fresh flowers in a delivery van, for example, may be quickly damaged if the driver turns the engine off upon leaving the van, and the driver is delayed in returning.

Thus, it would be desirable, and it is an object of the invention, to safely place an engine, which drives both the wheels of a vehicle and a refrigerant compressor, under control of the associated transport refrigeration system in predetermined circumstances, to maintain the cargo space of the vehicle at set point temperature during the absence of the driver, without being wasteful of engine fuel.

It would also be desirable, and it is a further object of the invention, to control the vehicle engine RPM, while operating under control of the transport refrigeration unit, to match engine RPM to the requirements of the served cargo space at any instant. This precludes the necessity of setting the engine idle RPM to a maximum value selected to handle the most extreme cargo demand conditions which may be encountered, again conserving engine fuel.

SUMMARY OF THE INVENTION

The invention is a transport refrigeration unit associated with a vehicle having a drive engine and a cargo space to be conditioned to a predetermined set point temperature via a predetermined refrigeration cycle, ie., a cooling cycle or a heating cycle. The transport refrigeration unit includes a refrigerant compressor, driven directly, or indirectly, by the vehicle drive engine, and sensor means for sensing the temperature of the cargo space. First means determines when the vehicle engine may be safely started under control of the transport refrigeration unit, second means determines when the cargo space requires a refrigeration cycle to maintain the set point temperature, and third means starts the vehicle engine when the first means finds that the vehicle engine may be safely started and the second means finds that the cargo space requires a refrigeration cycle to maintain the set point temperature.

The first means may also determine when the vehicle engine may be safely stopped under control of the transport refrigeration unit, the second means may also determine when the cargo space is satisfied, and the third means may also stop the vehicle engine when the first means finds that the vehicle engine may be safely stopped and the second means finds that the cargo space is satisfied.

The invention also includes a method of operating a transport refrigeration unit associated with a vehicle in which a drive engine for the vehicle additionally directly, or indirectly, drives a refrigerant compressor for the transport refrigeration unit, with the vehicle having a cargo space to be maintained at a predetermined set point temperature via a refrigeration cycle, ie., a cooling cycle or a heating cycle. The method includes the steps of determining when the vehicle engine may be safely started under control of the transport refrigeration unit, determining when the cargo space requires a refrigeration cycle to satisfy the selected set point temperature, and starting the vehicle engine after the determining steps find the vehicle engine may be safely started and the cargo space requires a refrigeration cycle.

The method may also include the steps of determining when the vehicle engine may be safely stopped under control of the transport refrigeration unit, determining when the cargo space is satisfied, and stopping the vehicle engine after the determining steps find the vehicle engine may be safely stopped and the cargo space is satisfied.

In a preferred embodiment of the invention, the transport refrigeration unit and method of operating same, controls the speed of the vehicle engine during cooling and heating cycles as a function of predetermined parameters which determine engine load an any instant, including the set point temperature, the temperature of the cargo air, and ambient air temperature. In the event the transport refrigeration unit includes a heating cycle of the type which receives heat from vehicle engine coolant, one of the predetermined parameters during a heating cycle includes the temperature of the engine coolant, as it is important that the engine coolant reach maximum operating temperature as quickly as possible. When the transport refrigeration unit is in a defrost cycle, an optimum defrost RPM is selected for the Vehicle drive engine.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
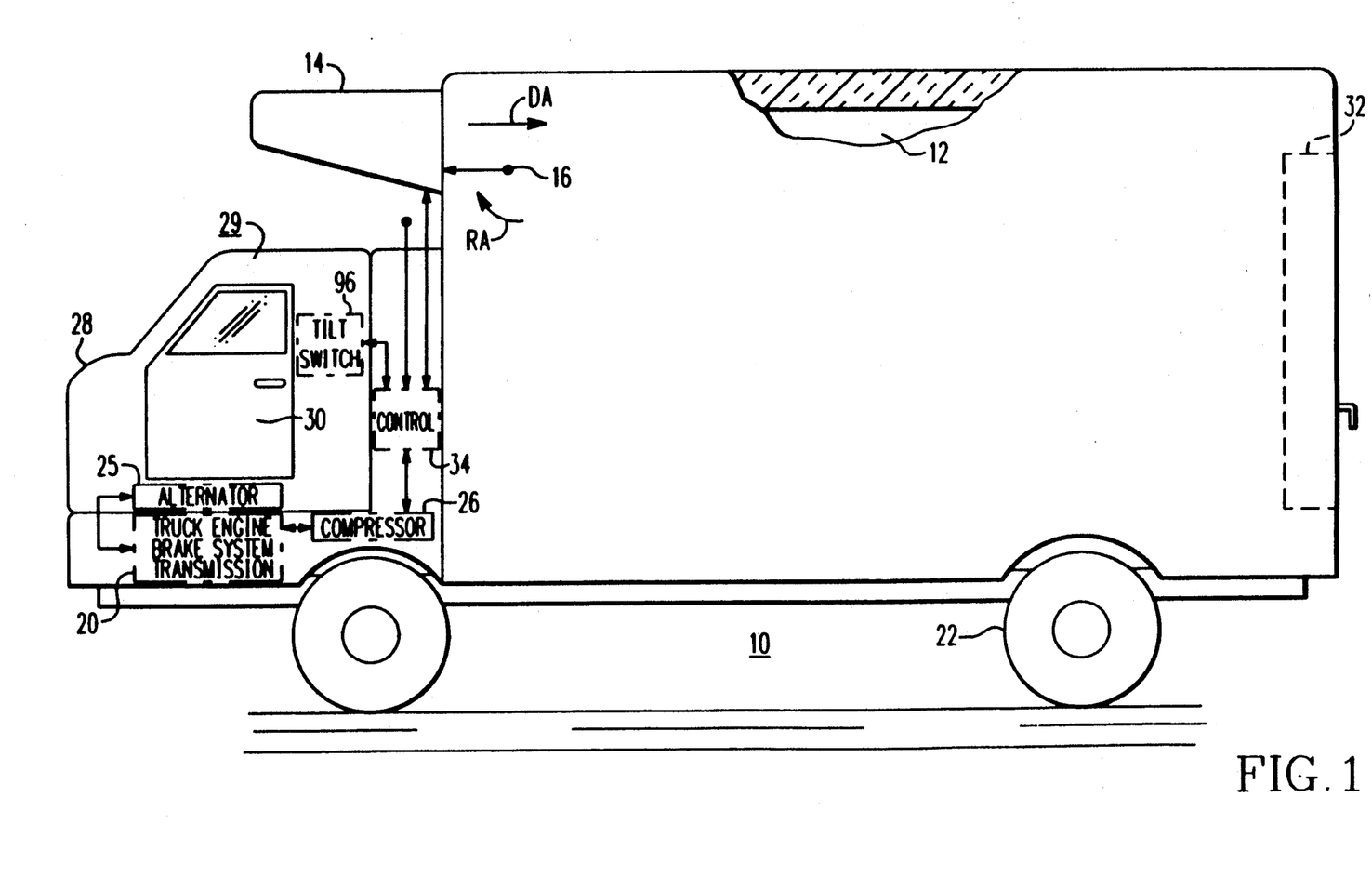
FIG. 1 is an elevational view of a refrigerated straight truck of the type which may be associated with a transport refrigeration unit constructed according to the teachings of the invention.
Figure 2:
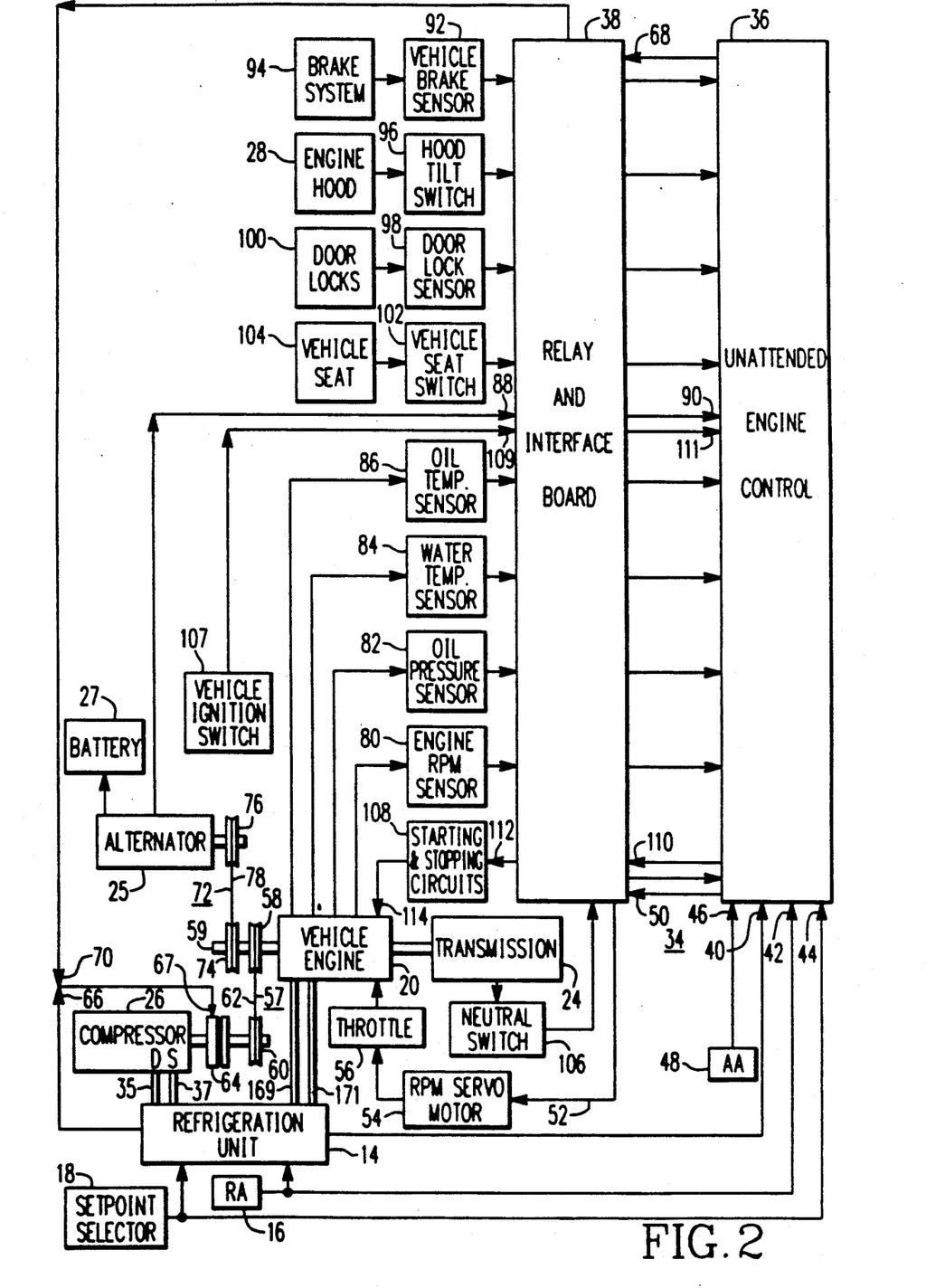
FIG. 2 is a detailed block diagram which sets forth a transport refrigeration unit which controls the engine of an associated truck or van according to the teachings of the invention.

Referring now to the drawings, and to FIG. 1 in particular, there is shown a vehicle 10 having a refrigerated cargo space 12, return air RA of which is conditioned to a predetermined narrow temperature range or band adjacent to a selected set point temperature by a transport refrigeration unit 14, and discharged back into cargo space 12 as discharge air DA. A temperature sensor 16 is disposed in cargo space 12, such as to sense the temperature of the return air RA, and a set point selector 18, shown in FIG. 2, is manually set to indicate the desired temperature of cargo space 12. Vehicle 10 includes a drive engine 20, such as an internal combustion engine, gas or Diesel, which, in addition to driving vehicle wheels 22 via a suitable transmission 24 shown in FIG. 2, drives a refrigerant compressor 26 and alternator 25. Alternator 25 maintains a vehicle battery 27 in a fully charged condition. An engine hood 28 provides access to vehicle drive engine 20. Vehicle 10 additionally includes a cab 29 having a cab door, or doors, indicated at 30, and a cargo space access door 32. A control module 34 links transport refrigeration unit 14 and vehicle engine 20, placing vehicle engine 30 under control of transport refrigeration unit 14 during predetermined safe operating conditions, which are sensed by a plurality of sensors to be hereinafter described.

While vehicle 10 is indicated in FIG. 1 as being a straight truck, it is to be understood that the word "vehicle" as used herein means any type of vehicle having a vehicle engine which also drives a refrigerant compressor of an associated transport refrigeration unit. The word "drives" is meant to broadly cover both direct and indirect drive arrangements. For example, the vehicle engine may directly drive a refrigerant compressor, such as via a pulley-belt arrangement between the vehicle engine and the refrigerant compressor, or indirectly via hydraulic, pneumatic or electric motors which are powered by a hydraulic pump, an air compressor, or an electric generator or alternator driven by the vehicle engine.

FIG. 2 sets forth a detailed block diagram of vehicle 10 and transport refrigeration unit 14 shown in FIG. 1, with compressor 26 being linked to refrigeration unit 14 via a hot gas line or conduit 35, and a suction line or conduit 37. Electrical control module 34 shown in FIG. 1 includes unattended engine control 36, which in a preferred embodiment is microprocessor based. Engine control 36 is interfaced to engine 20 and a plurality of sensors, to be hereinafter described, via a relay and interface board 38.

Transport refrigeration unit 14 provides certain information to engine control 36, indicated by arrow 40, such as whether or not unit 14 has been activated by turning on an on-off switch, and when activated, information concerning the condition of cargo space 12, as indicated by cargo air temperature sensor 16 and arrow 42. For example, the additional information indicates whether cargo space 12 requires a cooling cycle or a heating cycle to maintain the set point temperature selected by set point selector 18, and it also indicates when cargo space is "satisfied", ie., requiring neither a cooling cycle nor a heating cycle to maintain set point, which is called a "null" condition or cycle.

In order to implement a preferred embodiment of the invention which determines optimum RPM of vehicle engine 20, which matches engine speed with the heating and cooling requirements of cargo space 12 at any instant, additional information is provided to engine control 36. This additional information includes the temperature of the cargo space 12, indicated by arrow 42, such as the temperature of the return air RA entering unit 14 from cargo space 12, such as indicated by sensor 16; the set point temperature, indicated by arrow 44, as provided by set point selector 18; and the ambient air temperature AA, indicated by arrow 46, as provided by an ambient air temperature sensor 48.

After determining the optimum engine RPM, control 34 provides a control signal or value representative of the selected RPM, indicated by arrows 50 and 52, for an RPM servo motor 54 which is operably connected to an engine throttle 56 associated with vehicle engine 20.

Vehicle engine 20 may drive refrigerant compressor 26 by any suitable means, such as via a belt and pulley arrangement 57 which includes a pulley 58 on an engine crankshaft 59, a pulley 60 associated with compressor 26, and a linking belt 62. Pulley 60 may be linked to compressor 26 via an electrically controlled clutch 64 which is controlled by transport refrigeration unit 14, as indicated by arrows 66 and 67, and by engine control 36, as indicated by arrows 68 and 70. As hereinbefore stated, alternate engine-compressor drive arrangements include: (1) alternator 25, which is driven by vehicle engine 20, being sized to handle the requirements of a compressor drive motor; (2) engine 20 being connected to drive an air compressor linked to a pneumatic motor which drives refrigerant compressor 26; and (3) engine 20 being connected to drive a hydraulic pump linked to a hydraulic motor which drives compressor 26. As indicated in FIG. 2, alternator 25 is driven by a belt and pulley arrangement 72 which includes a pulley 74 on crankshaft 59 of engine 20, a pulley 76 associated with alternator 25, and a linking belt 78.

A plurality of sensors associated with vehicle engine 20 provide information to engine control 36, such as an engine RPM sensor 80, engine oil pressure sensor 82, engine water temperature sensor 84, and engine oil temperature sensor 86. In addition, feed back is provided to engine control 36 relative to the charging rate of vehicle battery 27 by alternator 25, as indicated by arrows 88 and 90.

In order for engine control 36 to determine if it is safe to place vehicle engine 20 under independent control, a plurality of additional sensors provide signals for engine control 34. "Independent control" means that engine 20 will be automatically controlled by the electrical control module 34 of transport refrigeration unit 14. The plurality of additional sensors include a vehicle brake sensor 92 which senses when brakes of a vehicle brake system 94 are set or applied; a hood tilt switch 96 associated with vehicle engine hood 28, which senses when the hood 28 is closed; a door lock sensor 98 associated with vehicle door locks 100, which senses when the cab doors 30 are closed and locked, as well as closure of cargo door 32; and a seat switch 102 associated with a vehicle seat 104 in the vehicle cab 29. In addition, a switch 106, associated with engine transmission 24, indicates when transmission 24 is in a neutral position. The word "neutral" as used herein means a safe position, eg., when a manual transmission is in the neutral position, and when an automatic transmission is the neutral or a park position. Also, an indication of the position of the vehicle ignition switch 107 may be provided, as indicated by arrows 109 and 111.

When engine control 36 deems that it is safe to start and stop vehicle engine 20, it activates engine starting and stopping circuits 108, as indicated by arrows 110, 112 and 114.

Figure 3:
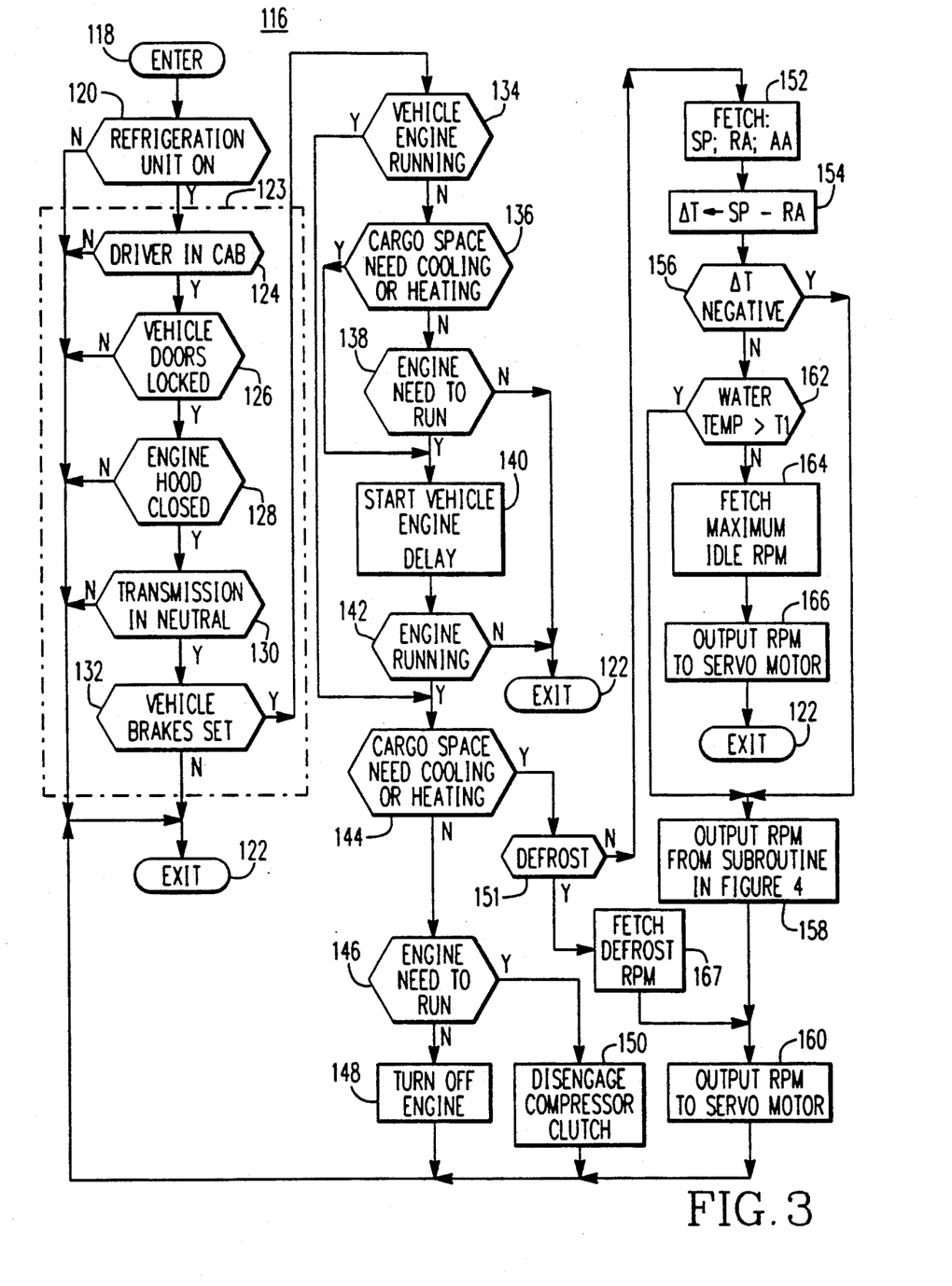
FIG. 3 is a detailed flow diagram of a computer program which implements an unattended engine control function of the transport refrigeration unit shown in block form in FIG. 2.

FIG. 3 is a detailed flow diagram of a program 116 which implements engine control 36. The illustrated sequence of steps in program 116 is exemplary only; it will be apparent that modifications and changes in sequence may be made without departing from the spirit and scope of the invention. Program 116 is automatically and periodically entered at 118, under control of a timing function associated with control 36, and step 120 determines if transport refrigeration unit 14 has been activated, ie., whether or not an on-off switch in unit 14 is in the "on" position, as indicated in the information associated with by arrow 40. If unit 14 is off, then program 118 exits at 122. When step 120 finds that unit 14 is activated, and therefore discharging conditioned air DA into cargo space 12, program 116 enters a first portion 123 thereof which determines if the vehicle engine 20 should be placed under independent control, and whether or not it is safe to do so. Accordingly, step 120 advances to step 124 which determines if the driver of vehicle 10 is in the vehicle cab 29. If the driver is in the cab, such as indicated by an actuated seat switch 102 associated with vehicle seat 104, vehicle 10 and transport refrigeration system 14 are completely under driver control, and the program exits at 122.

If the driver is not in cab 29, such as indicated by an unactuated seat switch 102, then program 116 continues to step 126 which determines if the cab doors 30 are closed and locked, and if the cargo space door 32 is at least closed. It would not be desirable to start vehicle engine 20, for example, if vehicle 20 is unattended, if the cab doors 30 are not closed and locked, as it would invite theft of the vehicle. Thus, if doors 30 are open, or closed and not locked, program 116 exits at 122. It would not be desirable to independently start or stop vehicle engine 20 with cargo door 32 open, as the open door indicates that the driver is still in command of vehicle 10. If cargo door 32 is open, program 116 exits at 122.

If doors 30 are closed and locked, and cargo door 32 is closed, program 116 continues to step 128 which determines if the vehicle engine hood 28 is closed, such as indicated by hood tilt switch 96, or any other suitable switch which indicates the position of engine hood 28. If engine hood 28 is not closed, it indicates vehicle 10 is under control of the driver, and program 116 exits at 122.

When step 128 finds engine hood 28 closed, step 128 continues to step 130 which determines if the vehicle transmission 24 is in a position which makes it safe to place vehicle engine 20 under independent control. Switch 106 is checked by step 130, with switch 106 being a neutral or a park switch, for example. If transmission 24 is not in neutral or park, it indicates that vehicle 10 is under control of the driver and program 116 exits at 122.

When step 130 finds that the transmission 24 is in a safe position, step 130 advances to step 132 which determines if the vehicle brake system 94 has been actuated to set the vehicle brakes, as sensed by brake sensor 92. If the vehicle brakes are not set, vehicle 10 is deemed to be under driver control, and program 116 exits at 122. An optional input may indicate whether or not the vehicle ignition switch 107 is closed or open. If it is desired to place engine 20 under independent control whether or not the driver left engine 20 running, then the position of the ignition switch 107 is not relevant. It is desired to only place engine 20 under independent control when the driver leaves vehicle 10 with engine 20 running, then program 116 would check the position of ignition switch 107, exiting program 116 at 122 if ignition switch 107 is not closed.

The hereinbefore described steps determine if it is safe to place engine 30 under independent control. If program 116 arrives at the "yes" branch of step 132, the safety of independent vehicle engine control is confirmed and program 116 continues to step 134 which determines if engine 20 is running, such as by checking the RPM sensor 80, and/or by checking oil pressure sensor 82. If engine 20 is not running, step 134 advances to step 136. Step 136 determines if cargo space 12 requires a refrigerant cycle, ie., a cooling cycle or a heating cycle, to achieve the set point temperature, or whether or not the cargo space is satisfied, ie., in a null cycle which requires neither a cooling cycle nor a heating cycle to maintain the temperature of cargo space 12 within a predetermined narrow temperature range adjacent to the selected set point temperature. Step 136 may do this by checking the requirements of cargo space 12 as determined by unit 14, which information is included in the information indicated by arrow 40. On the other hand, step 136 may make this determination by subtracting the return air temperature RA from the set point temperature SP, and apply the same control algorithm to the resulting $\Delta T$ which is used by unit 14 in determining cooling, heating and null cycles.

If cargo space 12 is satisfied, step 136 advances to step 138 which determines if engine 20 has a need to run. For example, control 36 may maintain engine 20 in a ready-to-start condition by insuring that the engine coolant temperature, as indicated by engine water temperature sensor 84, is above a predetermined temperature. If step 138 finds that engine 20 does not have a need to run, then step 138 advances to program exit 122.

When engine 20 is not running and cargo space 12 is not satisfied, step 136 advances to step 140, as does step 138 when step 138 finds that engine 20 has a need to run. Step 140 starts engine 20, and provides a delay loop long enough for a successful engine start. Application Ser. No. 07/728,665, filed Jul. 11, 1991, sets forth a microprocessor based system for starting and stopping a dedicated prime mover engine for a refrigerant compressor under the control of a transport refrigeration system, and the teachings of that patent application may be used to implement step 140. Accordingly, the aforesaid application Ser. No. 07/728,665 is hereby incorporated into the specification of the present application by reference.

Step 140 then advances to step 142 to determine if engine 20 successfully started, which may be determined by the inputs of RPM sensor 80 and/or engine oil pressure sensor 82. If engine 20 failed to start, program 116 exits at 122.

When step 142 finds engine 20 started successfully, step 142 advances to step 144, as does step 134 when step 134 finds engine 20 already running. Step 144 determines if cargo space 12 requires a cooling cycle or a heating cycle to achieve the set point temperature, or whether cargo space 12 is satisfied, ie., in a null cycle. Step 144 may make this determination as described relative to step 136. If cargo space 144 is satisfied, step 144 advances to step 146 which determines if engine 20 should be kept running for other purposes. Such other purposes, for example, may include elevating the temperature of the engine coolant, as sensed by water temperature sensor 84, above a predetermined level before shutting engine 20 off, and/or to insure that the charge condition of vehicle battery 27 is such that an engine re-start will be assured, with the charge condition being indicated by inputs 88 and 90. When step 146 finds that engine 20 has no need to run, step 148 turns engine 20 off, and the program exits at 122. When step 146 finds that engine 20 has a need to run, step 150 disengages compressor clutch 64, since step 144 found that cargo space 12 was satisfied, and engine 20 is left running, as the program 116 exits at 122.

When step 144 finds that cargo space 12 is not satisfied, requiring a cooling or a heating cycle to maintain the selected set point temperature, or a heating cycle to defrost an evaporator coil associated with unit 14, program 116 enters a portion thereof which determines the optimum engine RPM for the current compressor loading on engine 20. Step 144 advances to step 151 which determines if unit 14 is in a defrost cycle. If not, step 151 goes to step 152 which retrieves the set point temperature SP, the temperature RA of the cargo space 12, and the ambient air temperature AA, from set point selector 18, sensor 16, and sensor 48, respectively. Step 154 subtracts the temperature of the return air from the set point temperature and stores the value in a program random access memory (RAM) as a value $\Delta T$, along with the algebraic sign of the difference. A negative value for $\Delta T$ indicates that the temperature of the return air RA is above set point, requiring a cooling cycle. A positive value indicates that the temperature of the return air RA is below set point, requiring a heating cycle, when a heating cycle has not been locked out by a setting of set point selector 18 which indicates that cargo space 12 contains a frozen load.

Figure 4:
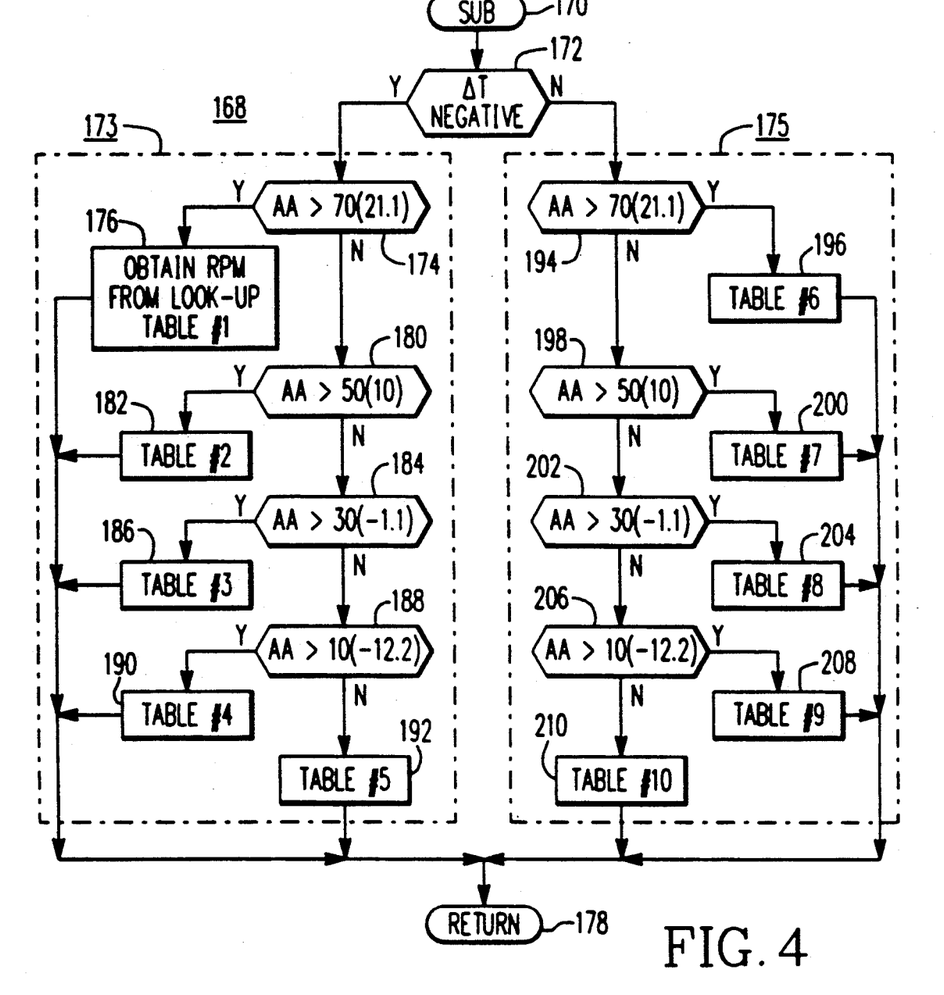
FIG. 4 is a detailed flow diagram of a subroutine called by the program of FIG. 3 to determine optimum engine RPM while the vehicle engine is under the control of the transport refrigeration unit.

Step 156 checks the sign of $\Delta T$, and if it is negative, indicating a cooling cycle, step 156 advances to step 158 which obtains the optimum engine RPM from a subroutine program 168 shown in FIG. 4. Step 160 outputs the RPM to servo motor 54, and program 116 exits at 122. When step 156 finds that $\Delta T$ is positive, indicating a heating cycle, if engine coolant is used to enhance the heating step, as indicated by water lines 169 and 171 in FIG. 1, which are disposed to run between unit 14 and engine 20, step 162 checks the temperature of the engine coolant via water temperature sensor 84 to insure that it is above a predetermined value T1. If it is not, then in order to elevate the engine coolant temperature as rapidly as possible, step 164 retrieves a maximum RPM value obtained from a program read-only memory (ROM), step 166 outputs the value to the servo motor 54, and the program exits at 122.

When step 162 finds the engine coolant temperature is above T1, then the engine RPM is determined by the compressor loading, and step 162 advances to the hereinbefore described step 158 which obtains the engine RPM from the subroutine set forth in FIG. 4.

When step 151 finds that a defrost cycle has been initiated by unit 14, step 151 goes to a step 167 which obtains a defrost RPM value from ROM, and this value is output to the servo motor in step 160 before program 116 exits at 122.

As hereinbefore stated, step 158 obtains the optimum operating RPM for engine 20 from subroutine 168 shown in FIG. 4. The optimum engine RPM is a function of the difference between the set point temperature SP and the actual temperature RA of cargo space 12, ie., $\Delta T$, and also the temperature AA the ambient air, as respectively provided by set point selector 18 and temperature sensors 16 and 48.

Program 170 of FIG. 4 is entered at 170, and if it is desired to provide different engine RPM values depending upon whether unit 14 is in a cooling or heat cycle, step 172 determines which cycle unit 14 is in, such as by checking the sign of $\Delta T$. If the same $\Delta T$ and temperature AA of the ambient air require the same RPM for both cooling and heating cycles, then step 172 may be eliminated, as well as the steps leading from one of the branches of step 172. For purposes of example, it will be assumed that cooling and heating cycles require different RPM values for like inputs to program 168, and that step 172 finds unit 14 in a cooling cycle. Step 172 proceeds to a first portion 173 of program 168 associated with optimum engine speed when unit 14 is in a cooling cycle.

Figure 5:
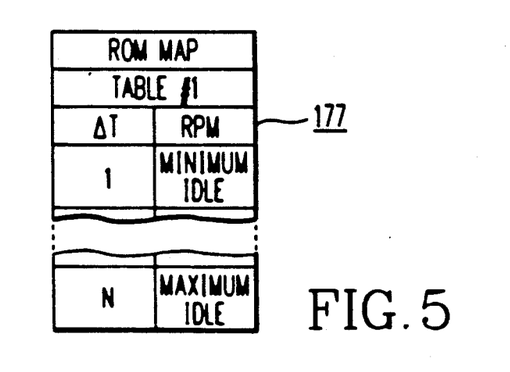
FIG. 5 is a ROM map of a look-up table format used by the subroutine of FIG. 4.

The first portion 173 of program 168 is initiated by step 174. Step 174 determines if the temperature AA of the ambient air is above a first value, such as 70° F. (21.1° C.). If it is, step 176 obtains the optimum RPM from a look-up table which will be called table #1. Table #1, as well as the remaining look-up tables, have the format of the look-up table 177 shown in the ROM map of FIG. 5. The absolute value of $\Delta T$ is used to access each look-up table and obtain an RPM value corresponding to the value of $\Delta T$. Subroutine 168 then returns to step 158 of FIG. 3 with the optimum value of engine RPM to be used with the current operating conditions.

If step 174 finds the temperature AA of the ambient air does not exceed 70° F. (21.1° C.), step 174 proceeds to step 180 which determines if AA exceeds a second predetermined value, such as 50° F. (10° C.). If it does, step 180 goes to look-up table #2 to obtain the optimum RPM, and then program 168 returns with the value to step 158 of FIG. 3.

If step 180 finds the temperature AA of the ambient air does not exceed 50° F. (10° C.), step 180 proceeds to step 184 which determines if AA exceeds a third predetermined value, such as 30° F. (−1.1° C.). If it does, step 184 goes to step 186 which obtains the optimum RPM from look-up table #3.

If step 184 finds the temperature AA of the ambient air does not exceed 30° F. (−1.1° C.), step 184 proceeds to step 188 which determines if AA exceeds a fourth predetermined value, such as 10° F. (−12.2° C.). If it does, step 188 goes to step 190 which obtains the optimum RPM from look-up table #4. If AA does not exceed 10° F. (−12.2° C.), then step 188 goes to step 192 which obtains the optimum value for the engine RPM from look-up table #5. The number of different predetermined values for AA, and the specific values thereof, are determined by, among other things, the horsepower of engine 20.

If step 172 finds that unit 14 is in a heating cycle, program 168 proceeds to a second portion 175 of program 168, with the second portion 175 being used to obtain optimum engine speed when unit 14 is in a heating cycle. The second program portion 175 is initiated by step 194. Step 194 and the following steps 196 through 210 of the second program portion 175 are similar to steps 174 through 192 of the first program portion 173 hereinbefore described, and thus the second program portion 175 will not be described again in detail. The main difference between the first and second program portions 173 and 175, which respectively obtain RPM values for the cooling and heating cycles, is that look-up tables #6 through #10 are accessed by steps 196, 200, 204, and 208 of the second program portion 175, instead of look-up tables #1 through #5, which are accessed by steps 176, 182, 186 and 190, of the first program portion 173.

We claim:

1. In a transport refrigeration unit associated with a vehicle having a drive engine and a cargo space to be conditioned to a predetermined set point temperature via a refrigeration cycle, with the transport refrigeration unit including a refrigerant compressor driven directly, or indirectly, by the vehicle drive engine and sensor means for sensing the temperature of the cargo space, the improvement comprising:

first means for determining when the vehicle engine may be safely started under control of the transport refrigeration unit, second means for determining when the cargo space requires a refrigeration cycle to maintain the set point temperature, third means for starting the vehicle engine when the first means finds that the vehicle engine may be safely started and the second means finds that the cargo space requires a refrigeration cycle to maintain the set point temperature, and means detecting when the transport refrigeration unit is activated, said first means including means detecting when the vehicle is in a safely parked condition, means detecting when the vehicle is unattended, and means detecting when the vehicle is locked.

2. The transport refrigeration unit of claim 1 wherein the first means further determines when the engine may be safely stopped under control of the transport refrigeration unit, and the second means further determines when the temperature of the cargo space is satisfied, and including:

stopping means for stopping the vehicle engine after the first means finds that the engine may be safely stopped and the second means determines that the cargo space is satisfied.

3. The transport refrigeration unit of claim 1 including:

means for determining a suitable engine operating speed during a refrigeration cycle as a function of the temperature of the cargo space and the set point temperature, and means for directing the engine to operate at the determined speed.

4. The transport refrigeration unit of claim 3 wherein the means for determining the engine speed during a refrigeration cycle periodically repeats the determination, with the directing means directing the engine to operate at a newly determined engine operating speed.

5. The transport refrigeration unit of claim 1 wherein the refrigeration cycle is a heating cycle, and including:

means for determining a suitable engine operating speed during a heating cycle as a function of predetermined parameters, and means directing the engine to run at the determined speed.

6. The transport refrigeration unit of claim 1 wherein the means for detecting when the vehicle is in a safely parked condition includes:

means detecting a set position of the vehicle brakes, means detecting a neutral position of the vehicle transmission, and means detecting a closed position of the vehicle hood.

7. In a transport refrigeration unit associated with a vehicle having a drive engine and a cargo space to be conditioned to a predetermined set point temperature via a refrigeration cycle, with the transport refrigeration unit including a refrigerant compressor driven directly, or indirectly, by the vehicle drive engine and sensor means for sensing the temperature of the cargo space, the improvement comprising:

first means for determining when the vehicle engine may be safely started under control of the transport refrigeration unit, second means for determining when the cargo space requires a refrigerant cycle to maintain the set point temperature, third means for starting the vehicle engine when the first means finds that the vehicle engine may be safely started and the second means finds that the cargo space requires a refrigeration cycle to maintain the set point temperature, ambient temperature sensor means, means for determining a suitable engine operating speed during a refrigeration cycle as a function of the temperature of the cargo space, the set point temperature, and the ambient temperature, and means for directing the engine to operate at the determined speed.

8. The transport refrigeration unit of claim 7 wherein the means for determining engine operating speed during a refrigeration cycle periodically repeats the determination, and wherein the directing means directs the engine to operate at a newly determined engine operating speed.

9. In a transport refrigeration unit associated with a vehicle having a drive engine and a cargo space to be conditioned to a predetermined set point temperature via a refrigeration cycle, with the transport refrigeration unit including a refrigerant compressor driven directly, or indirectly, by the vehicle drive engine and sensor means for sensing the temperature of the cargo space, the improvement comprising:

first means for determining when the vehicle engine may be safely started under control of the transport refrigeration unit, second means for determining when the cargo space requires a refrigeration cycle to maintain the set point temperature, third means for starting the vehicle engine when the first means finds that the vehicle engine may be safely started and the second means finds that the cargo space requires a refrigeration cycle to maintain the set point temperature, said refrigeration cycle including a cooling cycle and a heating cycle, said engine including liquid engine coolant, means providing heat for the transport refrigeration unit from the engine coolant during a heating cycle, sensor means for sensing the temperature of the engine coolant, means for determining a suitable engine operating speed during a heating cycle as a function of predetermined parameters, including the temperature of the engine coolant, and means directing the engine to run at the determined speed after starting.

10. The transport refrigeration unit of claim 9 wherein the means for determining engine operating speed repeats the determination periodically after the engine is started, and wherein the directing means directs the engine to operate at a newly determined engine operating speed.

11. A method of operating a transport refrigeration unit associated with a vehicle in which a drive engine for the vehicle additionally directly, or indirectly, drives a refrigerant compressor for the transport refrigeration unit, with the vehicle having a cargo space to be maintained at a predetermined set point temperature via a refrigeration cycle, comprising the steps of:

determining when the vehicle engine may be safely started under control of the transport refrigeration unit, determining when the cargo space requires a refrigeration cycle, starting the vehicle engine after the determining steps find the vehicle engine may be safely started and the cargo space requires a refrigeration cycle to hold the predetermined set point temperature, and detecting when the transport refrigeration unit is activated, said determining step including the step of detecting when the vehicle is safely parked, including detecting when the vehicle is unattended, and detecting when the vehicle is locked.

12. The method of claim 11 including the steps of:

determining when the engine may be safely stopped under control of the transport refrigeration unit, determining when the temperature of the cargo space is satisfied, and stopping the vehicle engine after the determining steps find the engine may be safely stopped and the temperature of the cargo space is satisfied.

13. The method of claim 11 including the steps of:

determining a suitable engine operating speed as a function of predetermined parameters, with the predetermined parameters including the temperature of the cargo space and the set point temperature, and directing the engine, after the starting step, to operate at the determined speed.

14. The method of claim 13 including the steps of:

repeating the determining and directing steps after the starting step, and changing the operating speed of the vehicle engine in response to a predetermined change in a parameter used to determine vehicle engine operating speed.

15. The method of claim 11 wherein the refrigeration cycle is a heating cycle, and including the steps of:

determining a suitable engine operating speed during a heating cycle as a function of predetermined operating parameters, and directing the engine, after starting, to operate at the determined speed.

16. The method of claim 11 wherein the step of detecting when the vehicle is safely parked includes the steps of detecting the setting of the vehicle brakes, detecting a safe position of the vehicle transmission, and detecting a closed position of the vehicle hood.

17. A method of operating a transport refrigeration unit associated with a vehicle in which a drive engine for the vehicle additionally directly, or indirectly, drives a refrigerant compressor for the transport refrigeration unit, with the vehicle having a cargo space to be maintained at a predetermined set point temperature via a refrigeration cycle, comprising the steps of:

determining when the vehicle engine may be safely started under control of the transport refrigeration unit, determining when the cargo space requires a refrigeration cycle, starting the vehicle engine after the determining steps find the vehicle engine may be safely started and the cargo space requires a refrigeration cycle to hold the predetermined set point temperature, determining a suitable engine operating speed as a function of predetermined parameters, with the predetermined parameters including the temperature of the cargo space, the set point temperature, and ambient air temperature, and directing the engine, after the starting step, to operate at the determined speed.

18. The method of claim 17 including the steps of:

repeating the determining and directing steps after the starting step, and changing the operating speed of the vehicle engine in response to a predetermined change in a parameter used to determine vehicle engine operating speed.

19. A method of operating a transport refrigeration unit associated with a vehicle in which a drive engine for the vehicle additionally directly, or indirectly, drives a refrigerant compressor for the transport refrigeration unit, with the vehicle having a cargo space to be maintained at a predetermined set point temperature via a refrigeration cycle, comprising the steps of:

determining when the vehicle engine may be safely started under control of the transport refrigeration unit, determining when the cargo space requires a refrigeration cycle, starting the vehicle engine after the determining steps find the vehicle engine may be safely started and the cargo space requires a refrigeration cycle to hold the predetermined set point temperature, said refrigeration cycle including a cooling cycle and a heating cycle, said engine being cooled via liquid engine coolant, providing heat for the transport refrigeration unit from the engine coolant during a heating cycle, determining a suitable engine operating speed during a heating cycle as a function of predetermined operating parameters, including the temperature of the engine coolant, and directing the engine, after starting, to operate at the determined speed.

20. The method of claim 19 including the steps of:

repeating the determining step, and changing the engine operating speed in response to a predetermined change in an operating parameter.

* * * * *